US008762976B2

(12) United States Patent
Kaplan et al.

(10) Patent No.: US 8,762,976 B2
(45) Date of Patent: Jun. 24, 2014

(54) STATIC EXTENSIBILITY MODELS WITH DYNAMIC LANGUAGES AND SCRIPTS

(75) Inventors: Jesse D. Kaplan, Redmond, WA (US); John C. Gudenkauf, Bellevue, WA (US); James S. Miller, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 783 days.

(21) Appl. No.: 11/716,186

(22) Filed: Mar. 9, 2007

(65) Prior Publication Data

US 2008/0222627 A1 Sep. 11, 2008

(51) Int. Cl.
*G06F 9/44* (2006.01)

(52) U.S. Cl.
USPC ............ 717/168; 717/106; 717/115; 717/162

(58) Field of Classification Search
USPC ................. 717/101, 168, 100, 106, 115, 139; 719/328, 330
See application file for complete search history.

(56) References Cited

U.S. PATENT DOCUMENTS

| | | | | |
|---|---|---|---|---|
| 5,146,593 A | * | 9/1992 | Brandle et al. | 719/328 |
| 5,210,876 A | * | 5/1993 | Uchida | 717/139 |
| 5,469,574 A | * | 11/1995 | Chang et al. | 717/106 |
| 5,675,804 A | * | 10/1997 | Sidik et al. | 717/139 |
| 5,732,270 A | * | 3/1998 | Foody et al. | 719/316 |
| 5,974,257 A | * | 10/1999 | Austin | 717/125 |
| 6,096,094 A | * | 8/2000 | Kay et al. | 717/168 |
| 6,275,868 B1 | * | 8/2001 | Fraley et al. | 719/320 |
| 6,381,737 B1 | * | 4/2002 | Click et al. | 717/136 |
| 6,609,158 B1 | * | 8/2003 | Nevarez et al. | 719/316 |
| 6,779,172 B1 | * | 8/2004 | Weerawarana et al. | 717/115 |
| 6,931,455 B1 | * | 8/2005 | Glass | 719/316 |
| 7,020,867 B2 | * | 3/2006 | Underseth et al. | 717/106 |
| 7,073,130 B2 | | 7/2006 | Novak et al. | |
| 7,117,503 B2 | | 10/2006 | Camara et al. | |
| 7,129,961 B1 | | 10/2006 | Samra | |

(Continued)

FOREIGN PATENT DOCUMENTS

WO WO0139046 A1 5/2001
WO WO0209346 A1 1/2002

OTHER PUBLICATIONS

Mike Grogan, "Scripting for the Java Platform Final Draft Specification version 1.0", Jul. 2006, Sun Microsystems, Inc.*

(Continued)

*Primary Examiner* — Jue Louie
(74) *Attorney, Agent, or Firm* — Kevin Sullivan; Kate Drakos; Micky Minhas

(57) ABSTRACT

Various technologies and techniques are disclosed for generating add-in bridges that allow hosts to be extended using a dynamic language. The system programmatically determines static requirements that an add-in is required to implement in order to integrate with a particular host. The system programmatically generates the add-in bridge to conform to the requirements of the particular host and to operate like a compiled add-in while actually calling dynamic language script files that are executed by a scripting engine. The add-in bridge is generated by generating a component for the add-in that contains at least one class to conform to the host requirements. A constructor is then generated for the class. For each method the add-in is required to implement, a respective method is generated in the class that provides a stub implementation but that calls dynamic-language script files to perform a desired functionality.

17 Claims, 8 Drawing Sheets

(56) References Cited

U.S. PATENT DOCUMENTS

| | | | |
|---|---|---|---|
| 7,131,110 B2* | 10/2006 | Brewin | 717/108 |
| 7,181,745 B1* | 2/2007 | Foti | 719/310 |
| 7,546,606 B2* | 6/2009 | Upton | 719/318 |
| 2002/0041289 A1 | 4/2002 | Hatch et al. | |
| 2002/0092000 A1* | 7/2002 | Srinivasan et al. | 717/136 |
| 2002/0129054 A1 | 9/2002 | Ferguson et al. | |
| 2002/0133811 A1* | 9/2002 | Duftler et al. | 717/140 |
| 2003/0149801 A1* | 8/2003 | Kushnirskiy | 709/328 |
| 2005/0022161 A1 | 1/2005 | Burger et al. | |
| 2005/0044526 A1 | 2/2005 | Kooy | |
| 2005/0283446 A1 | 12/2005 | Dettinger et al. | |
| 2006/0129982 A1 | 6/2006 | Doyle | |
| 2008/0163167 A1* | 7/2008 | Buzinov et al. | 717/115 |

OTHER PUBLICATIONS

Shalloway et al. "Design Pattern Explained: A New Perspective on Object-Oriented Design", 2004, Addison-Wesley Profession, section "Abstract Classes Vs. Interfaces".*

O'Conner, "Scripting for the Java Platform", Jul. 2006, Sun.*

Andrew Clinick, "Script Happens .NET", Jun. 2001, Microsoft Corporation.*

David Beazley, "SWIG: An Easy to Use Tool for Integrating Scripting Languages with C and C++", 1996, Proceedings of the Fourth USENIX Tcl/Tk Workshop.*

Guido van Rossum, "Extending and Embedding the Python Interpreter", Sep. 28, 2005, Python Software Foundation, section 5.*

Jun Du, "Embedding Python in C/C++: Part I", Oct. 5, 2005, Code Project.*

"Oracle9i Developer Suite", Date: Dec. 2001, http://www.oracle.com/technology/products/ids/pdf/9ids2_twp.pdf.

Jai, Benchiao, "RADIUS: Rapid Application Delivery, Installation and Upgrade System", http://ieeexplore.ieee.org/iel4/6067/16205/00750034.pdf?isnumber=&arnumber=750034.

Merilinna, Janne, "A Tool for Quality-Driven Architecture Model Transformation", Date: 2005, http://virtual.vtt.fi/inf/pdf/publications/2005/P561.pdf.

* cited by examiner

STATIC EXTENSIBILITY MODELS WITH DYNAMIC LANGUAGES AND SCRIPTS

BACKGROUND

In modern software development, applications are often developed in such a fashion as to allow additional features and functionality to be added to the completed application. Applications that are developed in this fashion are said to be extensible or follow an extensibility model. One common method that is used to extend an application is to create functionality in a component called an add-in. A second common method that is used to extend an application is through the use of a scripting engine and scripts. An application that provides for extensibility is referred to as a host because that application provides the environment in which the extensions operate.

An add-in is a set of computer instructions compiled into at least one binary file. The add-in relies on the pre-defined knowledge of the host. Extending an application using a script does not require pre-defined knowledge of the host, but does require that the host implement an environment in which the script is to be executed. The reason the host must be aware of the script engine is because scripts, in general, are not compiled. Further, for a host to allow extensibility via scripts, the script engine must be defined before the application is completed so that it can be included as part of the available options. The host must also be aware of when to initiate the script engine and how and when to find the scripts to execute on it. This has the result of locking programmers into only those scripting languages that are supported for that application, if any are even supported at all.

SUMMARY

Various technologies and techniques are disclosed for generating add-in bridges that allow hosts to be extended using a dynamic language. Input is received from a user to generate an add-in bridge. The system programmatically determines one or more static requirements that an add-in is required to implement in order to integrate with a particular host. The system programmatically generates the add-in bridge to conform to the one or more requirements of the particular host and to operate like a compiled add-in while actually calling one or more script files that are executed by at least one scripting engine to implement a desired functionality. The one or more script files are written in a dynamic language.

The add-in bridge is programmatically generated by first generating a component for the add-in that contains at least one class to conform to the requirements of the host. A constructor is then generated for the class. For each method the add-in is required to implement, a respective method is generated in the class that provides a stub implementation for the respective method but that calls one or more dynamic-language script files that are executed by at least one scripting engine to perform an actual implementation of a desired functionality. In one implementation, hosts that do not support dynamic languages can be extended using dynamic languages with the add-in bridge.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
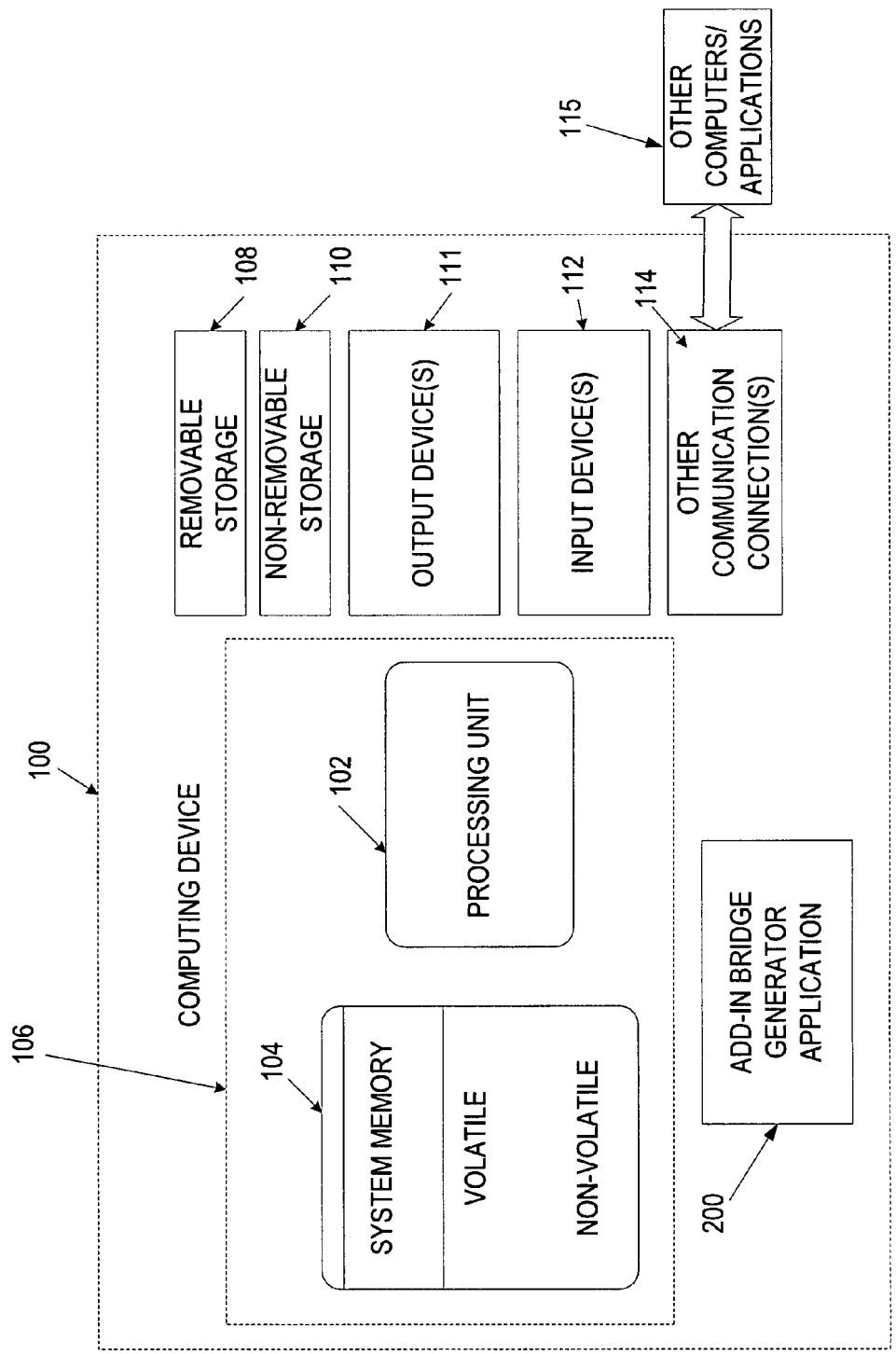
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that enables applications to be extended using add-ins, but the system also serves other purposes in addition to these. In one implementation, one or more of the techniques described herein can be implemented as features within a software development program such as MICROSOFT® VISUAL STUDIO® or from any other type of program or service that allows for the creation of add-in components. In one implementation, a system is provided that allows a host that has a static set of requirements that must be implemented by add-ins to be extended using script files. The system enables this extended add-in functionality by generating an add-in bridge that contains a stub for the requirements of the host, but calls the script engine and script files to do the actual work. The bridge can be generated dynamically at runtime, or statically by the add-in/script developer. This allows developers to write add-ins in one or more dynamic script languages of choice to extend a host with functionality that otherwise has a static set of requirements that are typically implemented in a compiled add-in.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes add-in bridge generator application 200. Add-in bridge generator application 200 will be described in further detail in FIG. 2.

Figure 2:
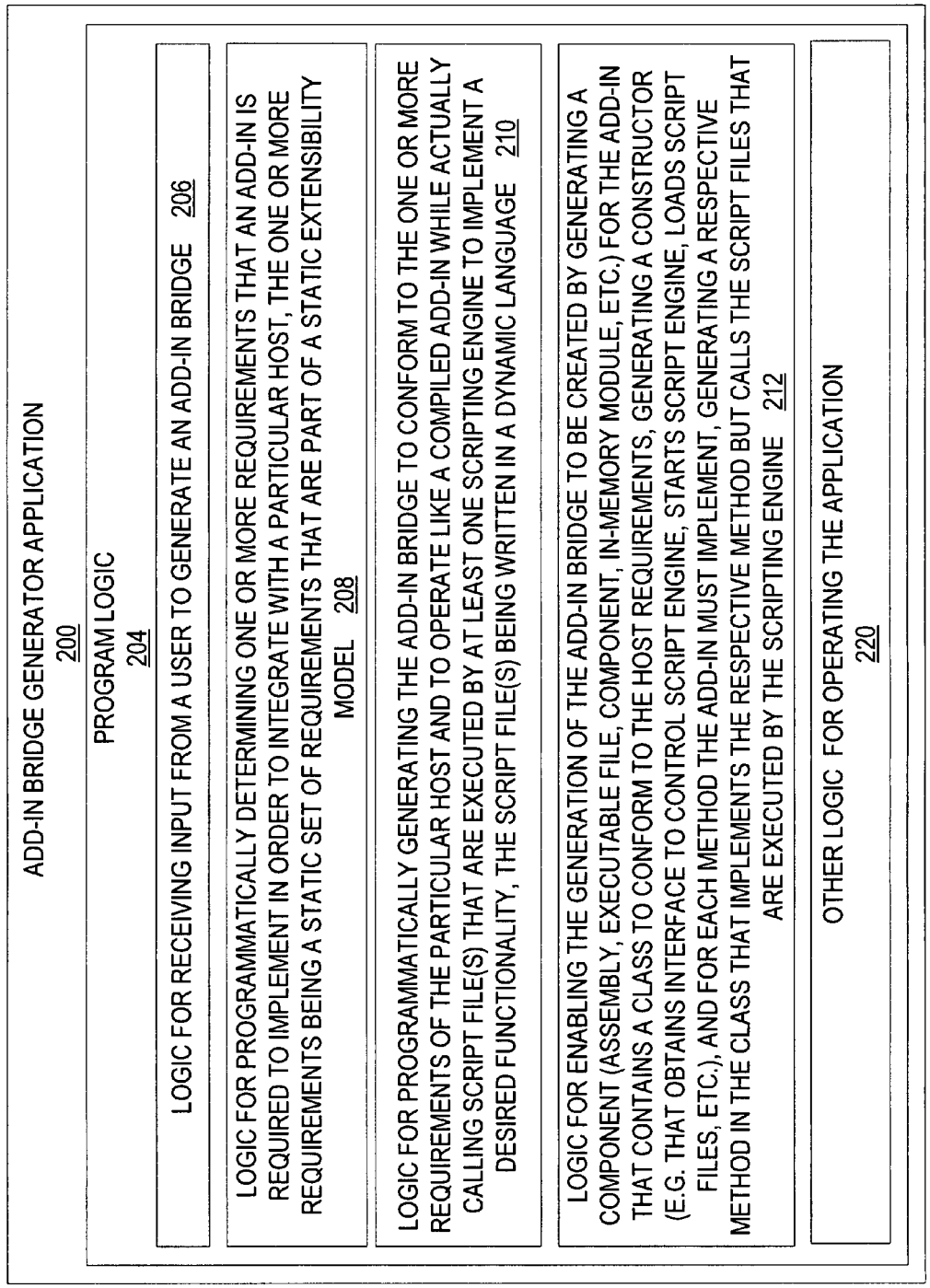
FIG. 2 is a diagrammatic view of an add-in bridge generator application of one implementation operating on the computer system of FIG. 1.

Turning now to FIG. 2 with continued reference to FIG. 1, an add-in bridge generator application 200 operating on computing device 100 is illustrated. Add-in bridge generator application 200 is one of the application programs that reside on computing device 100. However, it will be understood that add-in bridge generator application 200 can alternatively or additionally be embodied as computer-executable instructions on one or more computers and/or in different variations than shown on FIG. 1. Alternatively or additionally, one or more parts of add-in bridge generator application 200 can be part of system memory 104, on other computers and/or applications 115, or other such variations as would occur to one in the computer software art.

Add-in bridge generator application 200 includes program logic 204, which is responsible for carrying out some or all of the techniques described herein. Program logic 204 includes logic for receiving input from a user to generate an add-in bridge 206; logic for programmatically determining one or more requirements that an add-in is required to implement in order to integrate with a particular host, the one or more requirements being a static set of requirements that are part of a static extensibility model 208; logic for programmatically generating the add-in bridge to conform to the one or more requirements of the particular host and to operate like a compiled add-in while actually calling script file(s) that are executed by at least one scripting engine to implement a desired functionality, the script file(s) being written in a dynamic language 210; logic for enabling the generation of the add-in bridge to be created by generating a component (assembly, executable file, component, in-memory module, etc.) for the add-in that contains a class to conform to the host requirements, generating a constructor (e.g. that obtains an interface to control script engine, starts script engine, loads script files, etc.), and for each method the add-in must implement, generating a respective method in the class that implements the respective method but calls the script files that are executed by the scripting engine 212; and other logic for operating the application 220. In one implementation, program logic 204 is operable to be called programmatically from another program, such as using a single call to a procedure in program logic 204.

Figure 3:
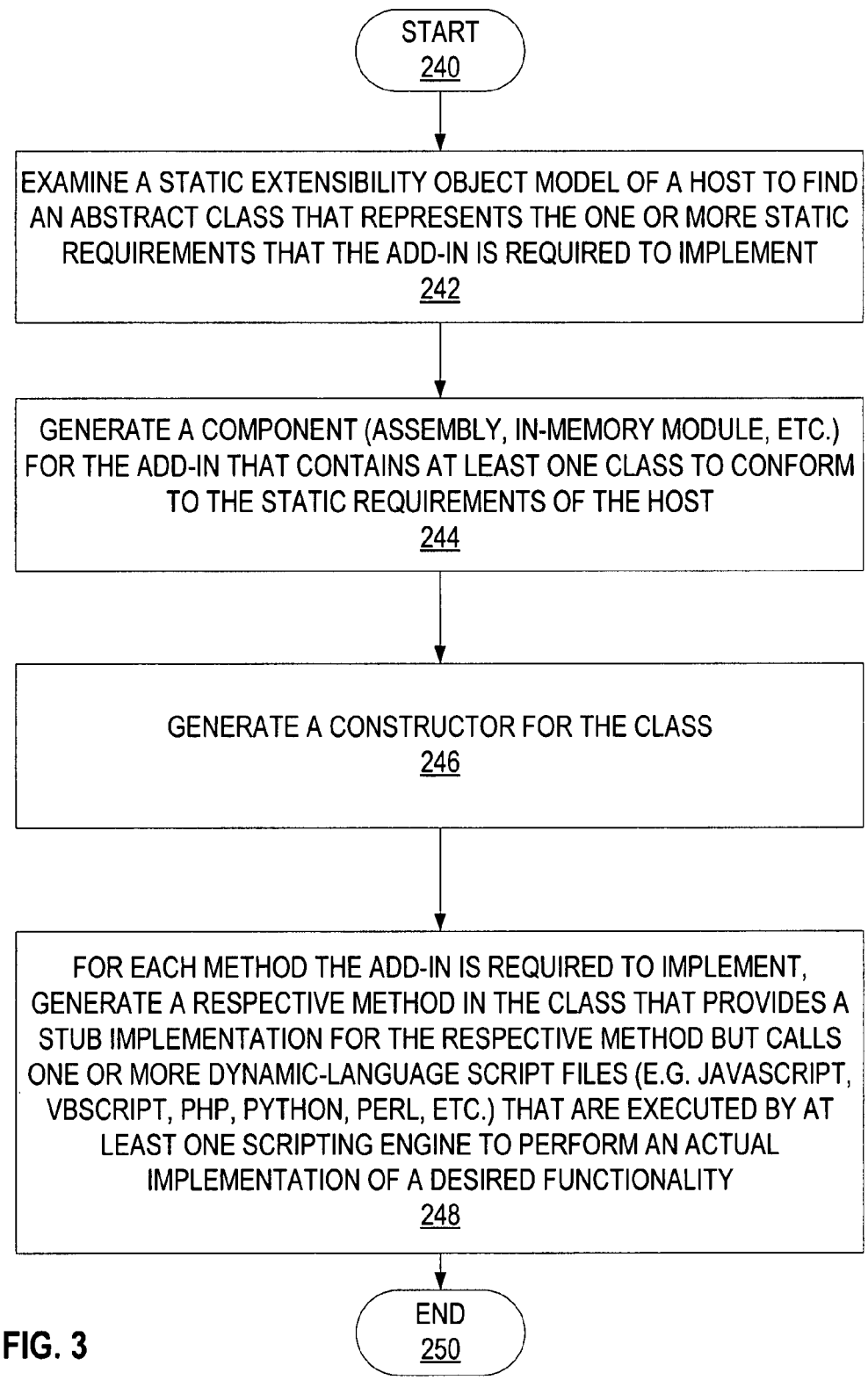
FIG. 3 is a high-level process flow diagram for one implementation of the system of FIG. 1.

Turning now to FIGS. 3-6 with continued reference to FIGS. 1-2, the stages for implementing one or more implementations of add-in bridge generator application 200 are described in further detail. FIG. 3 is a high level process flow diagram for add-in bridge generator application 200. In one form, the process of FIG. 3 is at least partially implemented in the operating logic of computing device 100. The process begins at start point 240 with examining a static extensibility object model of a host to find an abstract class that represents the one or more static requirements that the add-in is required to implement (stage 242). A component is generated (e.g. in an assembly, in-memory module, etc.) for the add-in that contains at least one class to conform to the static requirements of the host (stage 244). A constructor is generated for the class (stage 246). For each method the add-in is required to implement, a respective method is generated in the class that provides a stub implementation for the respective method but calls one or more dynamic-language script files (e.g. JAVASCRIPT®, VbScript, PHP, Python, Perl, etc.) that are executed by at least one scripting engine to perform an actual implementation of a desired functionality (stage 248). The process ends at end point 250.

Figure 4:
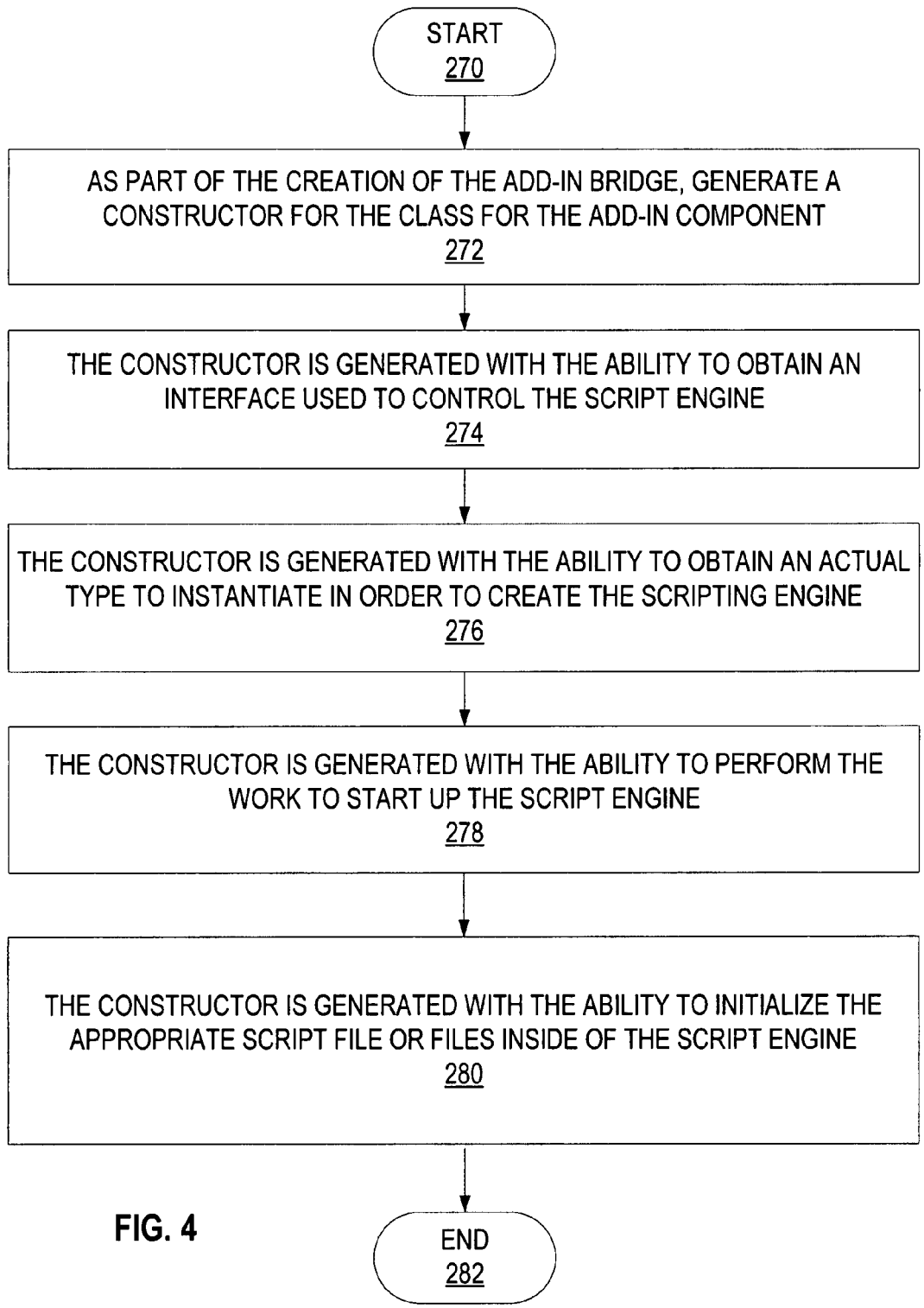
FIG. 4 is a process flow diagram for one implementation of the system of FIG. 1 illustrating the stages involved in generating the constructor for the class of the add-in component.

FIG. 4 illustrates one implementation of the stages involved in generating the constructor for the class of the add-in component. In one form, the process of FIG. 4 is at least partially implemented in the operating logic of computing device 100. The process begins at start point 270 with generating a constructor for the class for the add-in component as part of the creation of the add-in bridge (stage 272). The constructor is generated with the ability to obtain an interface used to control the script engine (stage 274). The constructor is generated with the ability to obtain an actual type to instantiate in order to create the scripting engine (stage 276). The constructor is generated with the ability to perform the work to start up the script engine (stage 278). The constructor is generated with the ability to initialize the appropriate script file or files inside of the script engine (stage 280). The process ends at end point 282.

Figure 5:
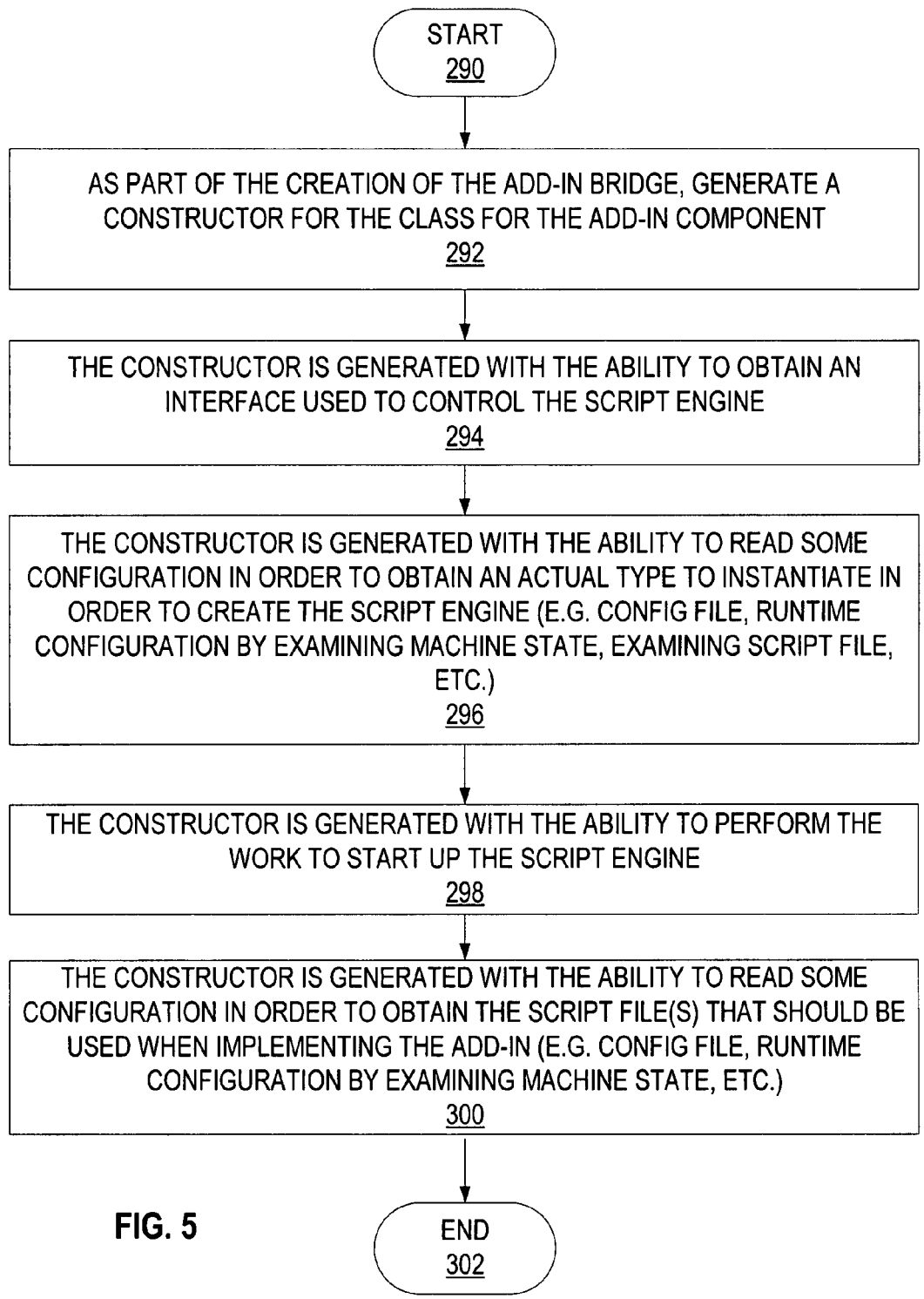
FIG. 5 is a process flow diagram for one implementation of the system of FIG. 1 illustrating the stages involved in generating a constructor for the class of an add-in component that is for a specific host and configurable to use different engines or script files.

FIG. 5 illustrates one implementation of the stages involved in generating a constructor for the class of an add-in component that is for a specific host and configurable to use different engines or script files. In one form, the process of FIG. 5 is at least partially implemented in the operating logic of computing device 100. The process begins at start point 290 with generating a constructor for the class for the add-in component as part of the creation of the add-in bridge (stage 292). The constructor is generated with the ability to obtain an interface used to control the script engine (stage 294). The constructor is generated with the ability to read some configuration in order to obtain an actual type to instantiate in order to create the script engine (stage 296). As a few non-limiting examples, this configuration may take the form of a configuration file, runtime configuration by examining machine state, examining the script file to be executed, etc. (stage 296). The constructor is generated with the ability to perform the work to start up the script engine (298). The constructor is generated with the ability to read some configuration in order to obtain the script engine file(s) that should be used when implementing the add-in (stage 300). As a few non-limiting examples, the configuration may take the form of a configuration file, runtime configuration by examining machine state, etc. (stage 300). The process ends at end point 302.

Figure 6:
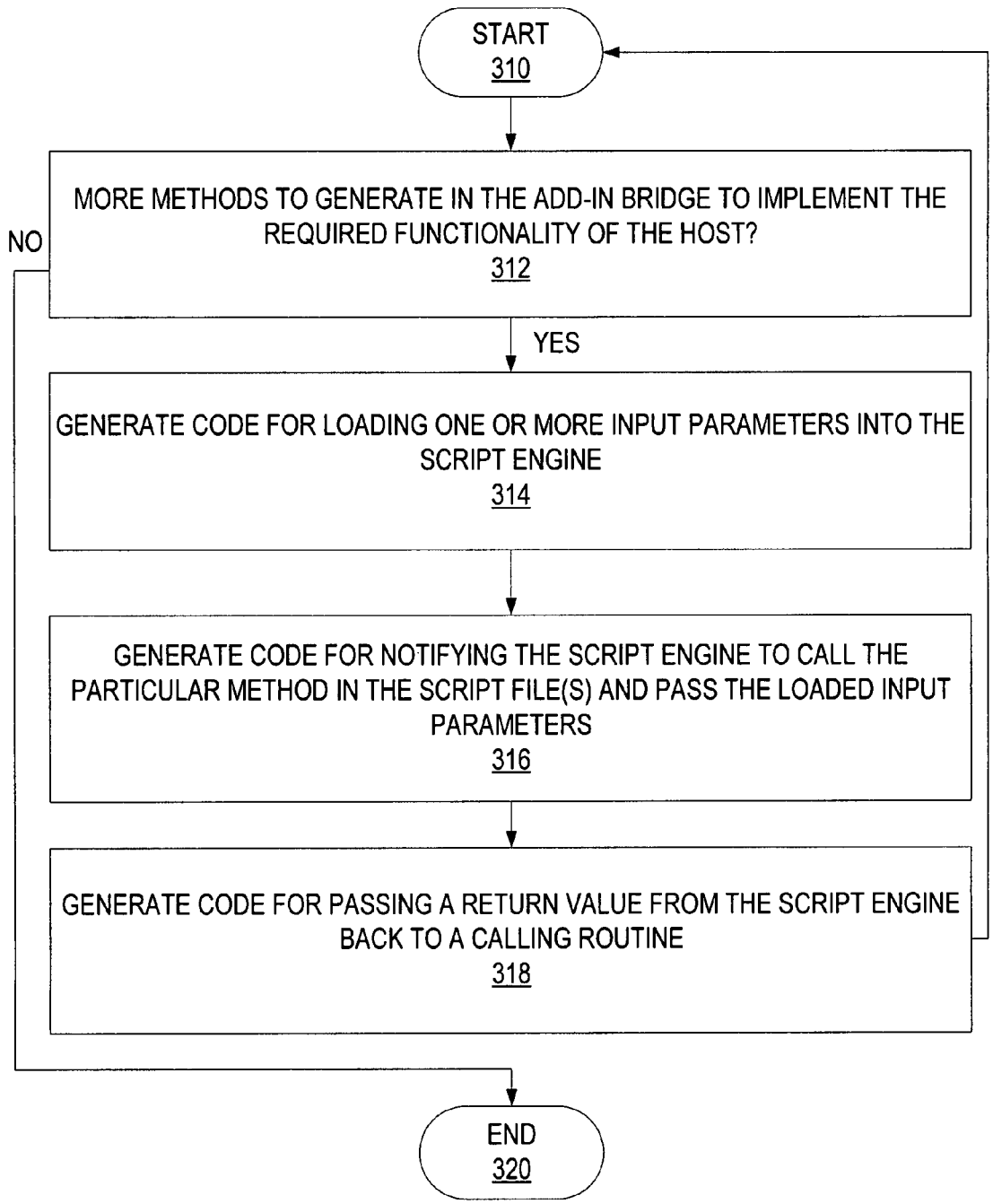
FIG. 6 is a process flow diagram for one implementation of the system of FIG. 1 illustrating the stages involved in generating each method for the add-in bridge that serves as a stub implementation that calls the script engine to do the work.

FIG. 6 illustrates one implementation of the stages involved in generating each method for the add-in bridge that serves as a stub implementation that calls the script engine to do the work. In one form, the process of FIG. 6 is at least partially implemented in the operating logic of computing device 100. The process begins at start point 310 with determining that there are more methods to generate in the add-in bridge to implement the required functionality of the host (decision point 312). Code is generated for loading one or more input parameters into the script engine (stage 314). Code is generated for notifying the script engine to call the particular method in the script file(s) and pass the loaded input parameters (stage 316). Code is generated for passing a return value from the script engine back to a calling routine (stage 318). The stages are repeated for each respective method to be created. The process then ends at end point 320.

Figure 7:
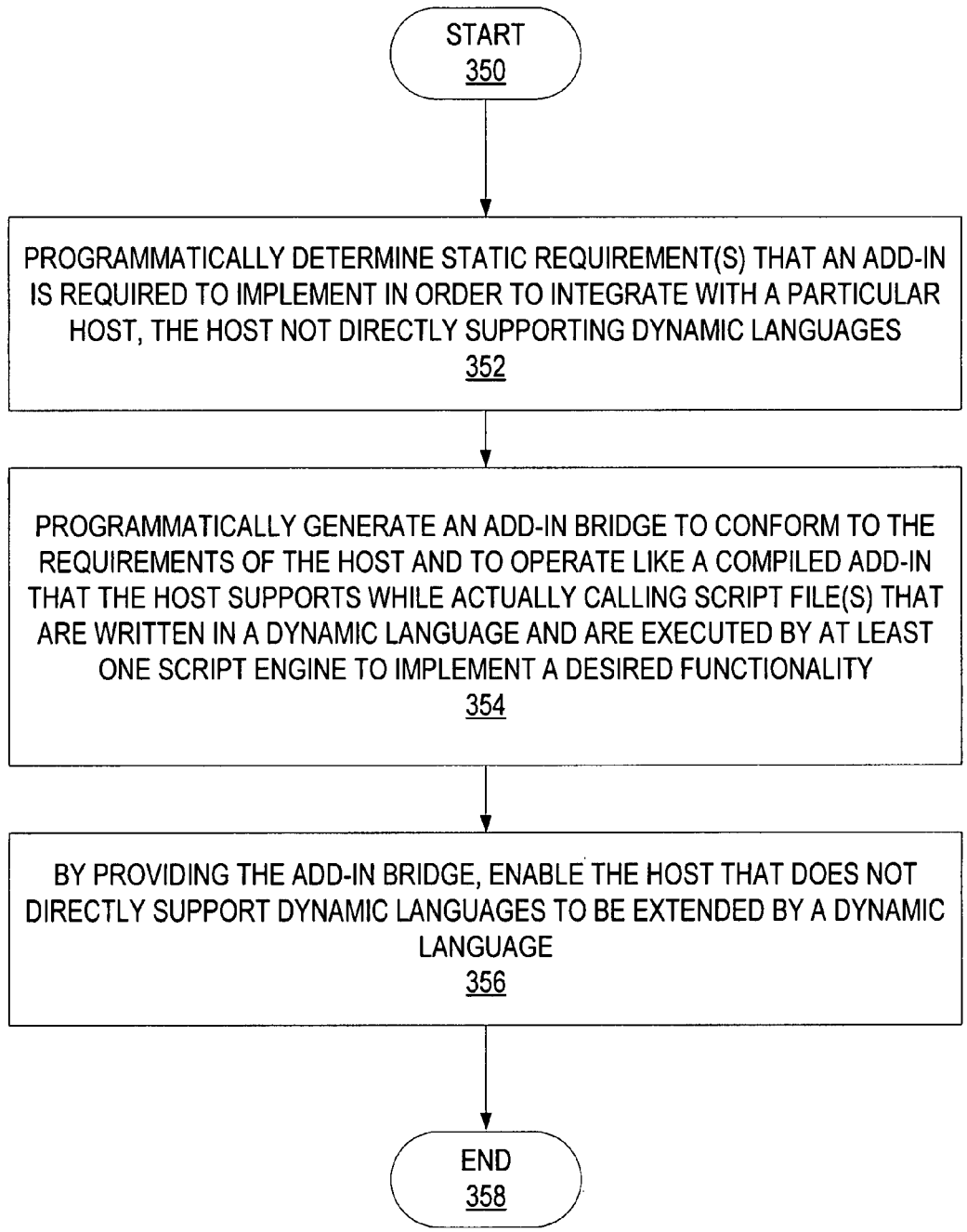
FIG. 7 is a process flow diagram for one implementation of the system of FIG. 1 illustrating the stages involved in allowing a host that does not support dynamic languages to be extended by dynamic script files.

FIG. 7 illustrates one implementation of the stages involved in allowing a host that does not support dynamic languages to be extended by dynamic script files. In one form, the process of FIG. 7 is at least partially implemented in the operating logic of computing device 100. The process begins at start point 350 with programmatically determining the static requirement(s) that an add-in is required to implement in order to integrate with a particular host, the host not directly supporting dynamic languages (stage 352). An add-in bridge is programmatically generated to conform to the requirements of the host and to operate like a compiled add-in that the host supports while actually calling script file(s) that are written in a dynamic language and are executed by at least one script engine to implement a desired functionality (stage 354). By providing the add-in bridge, the host that does not directly support dynamic languages can actually be extended by a dynamic language (stage 356). The process ends at end point 358.

Figure 8:
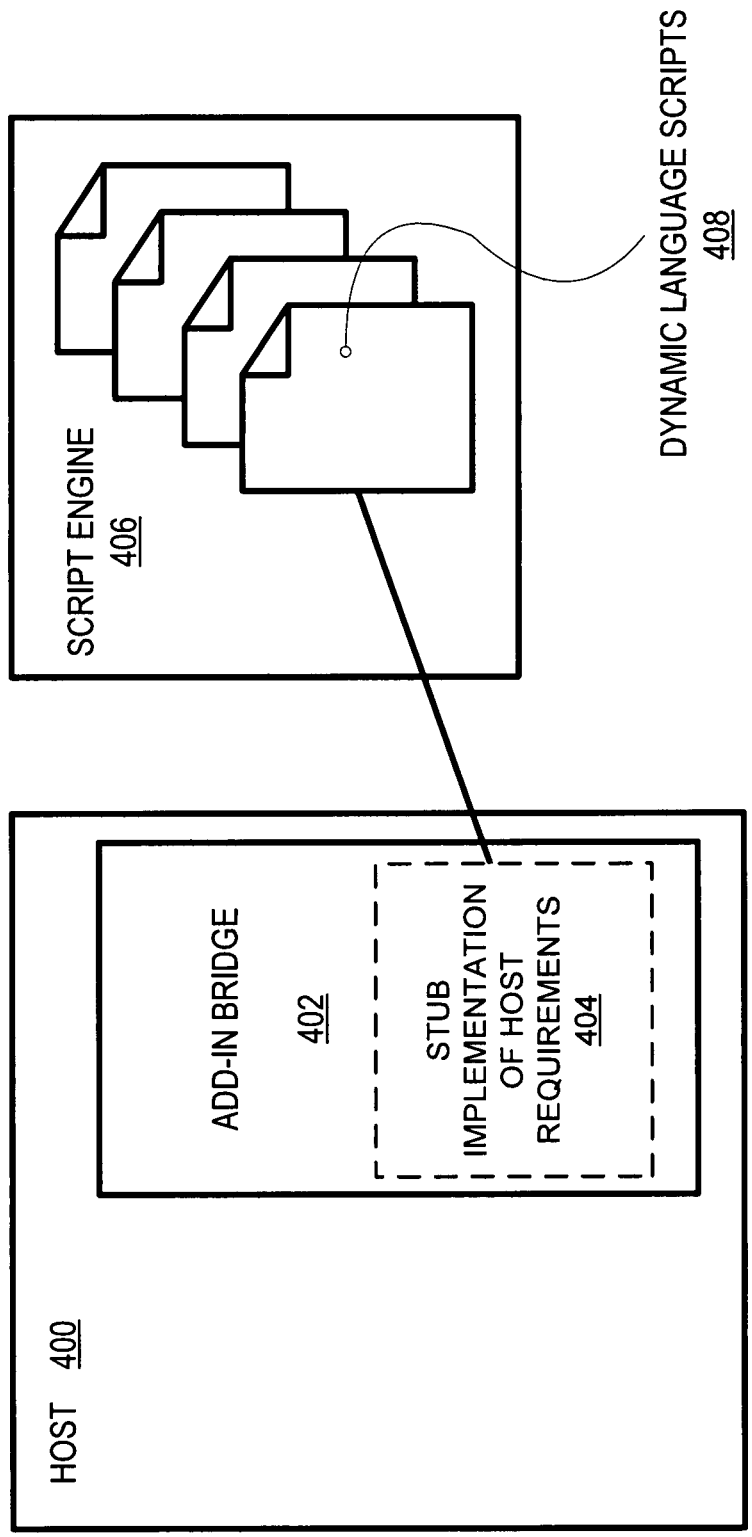
FIG. 8 is a logical diagram for one implementation of the system of FIG. 1 that illustrates an add-in bridge that interacts with a scripting engine for extending functionality of a host.

FIG. 8 is a logical diagram for one implementation of the system of FIG. 1 that illustrates an add-in bridge 402 that interacts with a scripting engine 406 for extending functionality of a host 400. The add-in bridge 402 contains a stub implementation of the host requirements 404. The stub implementation of the host requirements 404 call the dynamic language scripts 408 that are executed by the script engine 406. In one implementation, host 400 supports one or more dynamic languages. In another implementation, host 400 does not support any dynamic languages.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A computer storage memory having computer-executable instructions for causing a computer to perform steps comprising:
   receive input from a user to generate an add-in bridge to dynamically extend functionality of a particular host application that has one or more requirements to be met by a compiled add-in, the particular host application not directly supporting dynamic languages;
   programmatically determine the one or more requirements that an add-in is required to implement in order to integrate with the particular host application by examining an object model of the particular host application to find an abstract class that represents the one or more requirements, the one or more requirements being a static set of requirements that are part of a static extensibility model; and
   programmatically generate the add-in bridge dynamically to conform to the one or more requirements of the particular host application and to operate like a compiled add-in while actually calling one or more script files that are executed by at least one scripting engine to implement a desired functionality, the one or more script files being written in a dynamic language, wherein the generation of the add-in bridge further comprises:
     generate a component for the add-in bridge that contains at least one class to conform to the static set of requirements of the host application;
     generate a constructor for the class, wherein the constructor reads a configuration to obtain an actual type to instantiate in order to create a particular script engine from a plurality of script engines; and
     for each method the add-in bridge is required to implement, generate a respective method in the class that provides a stub implementation of the respective method but calls the one or more script files that are executed by the scripting engine to perform an actual implementation of a desired functionality.

2. The computer storage memory of claim 1, wherein the component is generated as an executable file.

3. The computer storage memory of claim 1, wherein the component is generated as an in-memory module.

4. The computer storage memory of claim 1, wherein the constructor is operable to perform work required to start up the particular script engine and load the one or more script files.

5. The computer storage memory of claim 1, wherein the constructor is operable to obtain an interface used to control the script engine.

6. The computer storage memory of claim 1, wherein the generating the component stage is operable to perform an appropriate registration of the component.

7. The computer storage memory of claim 1, wherein the configuration is read from a configuration file or by examining the one or more script files to be executed.

8. The computer storage memory of claim 1, wherein the configuration is read by examining machine state at runtime.

9. A method for programmatically generating an add-in bridge that extends a host functionality using a dynamic script comprising the steps of:
   receiving input from a user to generate an add-in bridge to dynamically extend functionality of a particular host application that has one or more requirements to be met by a compiled add-in, the particular host application not directly supporting dynamic languages;
   programmatically determining the one or more requirements that an add-in is required to implement in order to integrate with the particular host application by examining an object model of the particular host application to find an abstract class that represents the one or more requirements, the one or more requirements being a static set of requirements that are part of a static extensibility model; and programmatically generating the add-in bridge dynamically to conform to the one or more requirements of the particular host application and to operate like a compiled add-in while actually calling one or more script files that are executed by at least one scripting engine to implement a desired functionality, the one or more script files being written in a dynamic language, wherein the generation of the add-in bridge further comprises:

generating a component for the add-in bridge that contains at least one class to conform to the static set of requirements of the host application;

generating a constructor for the class, wherein the constructor reads a configuration to obtain an actual type to instantiate in order to create a particular script engine from a plurality of script engines; and for each method the add-in bridge is required to implement, generating a respective method in the class that provides a stub implementation of the respective method but calls the one or more script files that are executed by the scripting engine to perform an actual implementation of a desired functionality.

10. The method of claim 9, wherein the component is an executable file.

11. The method of claim 9, wherein the component is an in-memory module.

12. The method of claim 9, wherein the constructor will perform work required to start up the particular script engine and load the one or more script files.

13. The method of claim 12, wherein the constructor obtains an interface used to control the particular script engine.

14. The method of claim 9, wherein the generating the respective method step comprises the steps of:

generating code for loading one or more input parameters into the particular script engine;

generating code for notifying the particular script engine to call the particular method in the one or more script files and passing the loaded input parameters; and generating code for passing a return value from the particular script engine back to a calling routine.

15. The method of claim 9, wherein the dynamic language is selected from the group consisting of JavaScript, VBScript, PHP, Python, and Perl.

16. A computer system comprising:

a processing unit coupled to a memory, the memory storing computer-executable instructions which cause the processing unit to:

receive input from a user to generate an add-in bridge to dynamically extend functionality of a particular host application that has one or more requirements to be met by a compiled add-in, the particular host application not directly supporting dynamic languages;

programmatically determine the one or more requirements that an add-in is required to implement in order to integrate with the particular host application by examining an object model of the particular host application to find an abstract class that represents the one or more requirements, the one or more requirements being a static set of requirements that are part of a static extensibility model; and programmatically generate the add-in bridge dynamically to conform to the one or more requirements of the particular host application and to operate like a compiled add-in while actually calling one or more script files that are executed by at least one scripting engine to implement a desired functionality, the one or more script files being written in a dynamic language, wherein the generation of the add-in bridge further comprises:

generate a component for the add-in bridge that contains at least one class to conform to the static set of requirements of the host application;

generate a constructor for the class, wherein the constructor reads a configuration to obtain an actual type to instantiate in order to create a particular script engine from a plurality of script engines; and for each method the add-in bridge is required to implement, generate a respective method in the class that provides a stub implementation of the respective method but calls the one or more script files that are executed by the scripting engine to perform an actual implementation of a desired functionality.

17. The system of claim 16, wherein the dynamic language is selected from the group consisting of JavaScript, VBScript, PHP, Python, and Perl.

* * * * *